(12) United States Patent
Promper

(10) Patent No.: US 7,111,821 B2
(45) Date of Patent: Sep. 26, 2006

(54) CONTROL VALVE, IN PARTICULAR PLUG VALVE WITH SEALING SYSTEM

(75) Inventor: Christophe Promper, Heusy (BE)

(73) Assignee: Techspace Aero S.A., Herstal (BE)

( * ) Notice: Subject to any disclaimer, the term of this patent is extended or adjusted under 35 U.S.C. 154(b) by 50 days.

(21) Appl. No.: 10/742,680

(22) Filed: Dec. 18, 2003

(65) Prior Publication Data

US 2004/0129912 A1    Jul. 8, 2004

(30) Foreign Application Priority Data

Dec. 24, 2002    (EP) .................................. 02447279

(51) Int. Cl.
 *F16K 31/44*    (2006.01)
(52) U.S. Cl. ........................ 251/214; 277/553; 277/555
(58) Field of Classification Search ................ 251/214, 251/309, 315.01; 277/549, 551, 553, 555
See application file for complete search history.

(56) References Cited

U.S. PATENT DOCUMENTS

| | | | | |
|---|---|---|---|---|
| 3,192,942 A | * | 7/1965 | Manor et al. | 137/246.19 |
| 4,592,558 A | | 6/1986 | Hopkins | 251/214 |
| 4,658,847 A | * | 4/1987 | McCrone | 137/72 |
| 5,056,758 A | | 10/1991 | Bramblet | 277/205 |
| 6,161,838 A | * | 12/2000 | Balsells | 277/511 |

FOREIGN PATENT DOCUMENTS

| | | |
|---|---|---|
| EP | 1052439 A1 | 11/2000 |
| EP | 02447279.7 | 12/2002 |
| GB | 2340899 A | 1/2000 |

* cited by examiner

*Primary Examiner*—Edward K. Look
*Assistant Examiner*—John K Fristoe, Jr.
(74) *Attorney, Agent, or Firm*—Knobbe, Martens, Olson & Bear LLP

(57) ABSTRACT

The present invention relates to a plug valve comprising a valve body and a shutter that can be actuated, in the form of a segment of a sphere provided with a mobile shaft in rotation and/or translation, said valve also comprising a double-barrier sealing system at the level of said shaft, said valve being characterised in that the joints of said double-barrier sealing system are maintained in place relative to the shaft by a single lid.

8 Claims, 2 Drawing Sheets

CONTROL VALVE, IN PARTICULAR PLUG VALVE WITH SEALING SYSTEM

CROSS REFERENCE TO RELATED APPLICATIONS

This application claims priority under 35 U.S.C. § 119 to European Patent Application No. 02447279.7, filed on Dec. 24, 2002.

FIELD OF THE INVENTION

The present invention relates to a control valve, and in particular to a plug valve, integrating a shaft to be sealed having a double-barrier sealing system.

STATE OF THE ART

Many devices used in aeronautics, and more especially in the aerospace sector, are pneumatic or hydraulic systems using control valves with a seal relative to a mobile support. The spherical plug valve is a known example of such valves.

Typically, a spherical plug valve essentially comprises a valve body defining an essentially cylindrical chamber, with an inlet and an outlet. In addition, the valve comprises a shutter, located in the body of the valve and in the form of a segment of a sphere (plug) with one opening, the form of said segment of a sphere being essentially complementary to that of the chamber. This shutter is moreover provided at one of its ends, in general at its upper end, with a shaft or with a rod linked to an actuator and by means of which it can be given a rotary motion in order to open or to close the valve. A completely open position for such a valve is defined, in which the shutter is positioned relative to the chamber so that its opening is aligned with the inlet and with the outlet of the chamber and thus so as to allow the flow of fluid. A closed position for this valve is also defined, in which the shutter is positioned relative to the chamber so that this alignment between the opening of the shutter and the inlet and the outlet of the chamber does not exist, the shutter thus forming a barrier to the flow of fluid through the valve.

A sealing system is usually provided in these valves so as to ensure the seal of the zone upstream with regard to the zone downstream relative to the valve when the valve is closed. The purpose of this system is particularly important in the case where a low-pressure fluid is circulating in the upstream zone or in the case where a vacuum is maintained in this zone, while a high-pressure fluid is circulating in the downstream zone, or the other way round. This sealing system generally takes the form of a so-called "main" joint that is rigidly fixed at the level of the plug and ensures the seal of the upstream zone of the valve with regard to its downstream zone when the valve is closed. When the valve is opened, the main joint comes into contact with the spherical contact surface of the plug.

The sealing system of the valve usually also comprises an additional joint, called "static joint", located at the level of the shaft of the plug valve and the purpose of which is to ensure the seal of the valve relative to the outside.

In order to further improve the seal of such valves relative to the outside, it has been suggested that a double sealing system or device be used at the level of the shaft. Two sealing joints, a primary joint and a secondary joint, are thus arranged in series, one above the other so as to seal the faces of the shaft against which they are leaning. Each joint advantageously takes the form of a U-shaped joint, i.e. a circular or annular joint with a U-shaped cross-section. The primary and secondary joints thus define a primary cavity and a secondary cavity respectively.

According to the state of the art, both primary and secondary joints are located in a lid consisting of a mechanical part. These joints are therefore individually supported by bulky mechanical parts that are often directly fixed onto the casing by known means, such as screwed nuts.

As a particular advantage, any fluid present between the two joints will be eliminated by means for collecting leaks outward. In this way, the seal of the valve relative to the outside is improved.

AIMS OF THE INVENTION

The present invention aims to propose a simplified design of a plug valve having a double sealing system in order to ensure the seal of the valve relative to the outside, while at the same time retaining the existing advantages of the solutions provided in the state of the art.

In particular, the present invention also aims to propose a solution in which the collection of leaks is be retained.

Main Characteristic Elements of the Present Invention

The present invention relates to a plug valve comprising a valve body and a shutter that can be actuated, in the form of a segment of a sphere provided with a mobile shaft in rotation and/or translation, said valve also comprising a double-barrier sealing system at the level of said shaft, said valve being characterised in that the joints acting as a double-barrier seal are maintained in place relative to the shaft by means of a single lid made of a single mechanical part. This allows to wisely simplify the assembly and construction of this type of double seal plug valve.

These joints are preferably joints made of polymer or elastomer materials.

According to a first embodiment, the double-barrier sealing system consists of a primary joint and of a secondary joint arranged in series, one above the other along the shaft.

Said primary and secondary joints are preferably circular joints with a U-shaped cross-section and defining a primary cavity and a secondary cavity, respectively.

Said primary and secondary joints are preferably separated by a cross bar, preferably a T-shaped cross bar, the foot of which is located inside one of said cavities. This cross bar helps to maintain both joints (primary and secondary) in place.

Advantageously, in the present invention, pressure means for pushing the joints, more precisely the joint lips, onto the faces to be sealed of the valve shaft is located at the foot of the cross bar.

This pressure means acts as a spring and takes for instance the form of a metal sheet located inside the central cavity of the joint, and in particular of the primary joint.

Moreover, this pressure means allows to act in the event that the contact pressures are too important at the level of the secondary joint while avoiding the latter being crushed.

According to a second embodiment, the double-barrier seal consists of a double joint, preferably with two cavities, a primary cavity and a secondary cavity, preferably located one above the other along the shaft of the valve.

This double joint advantageously acts as a double U-joint or W-joint.

In this embodiment, as in the first embodiment, pressure means preferably taking the form of a metal sheet is located inside at least one of said cavities of the double joint.

In both preferred embodiments of the present invention, there is a channel that can collect any leaking liquid present in the lid that is protecting the double-barrier sealing system.

In the second embodiment, the valve also advantageously comprises an additional channel for collecting the leaking liquid, said channel being such that it passes through the double seal joint, preferably at the level of the junction between the primary and secondary cavities, and that it communicates with the channel for collecting the leaking liquid at the level of the lid.

In this way, the second, embodiment has the advantage of further reducing the number of parts while at the same time retaining the double seal and the collection of leaks.

DETAILED DESCRIPTION OF THE VARIOUS EMBODIMENTS

Figure 1:
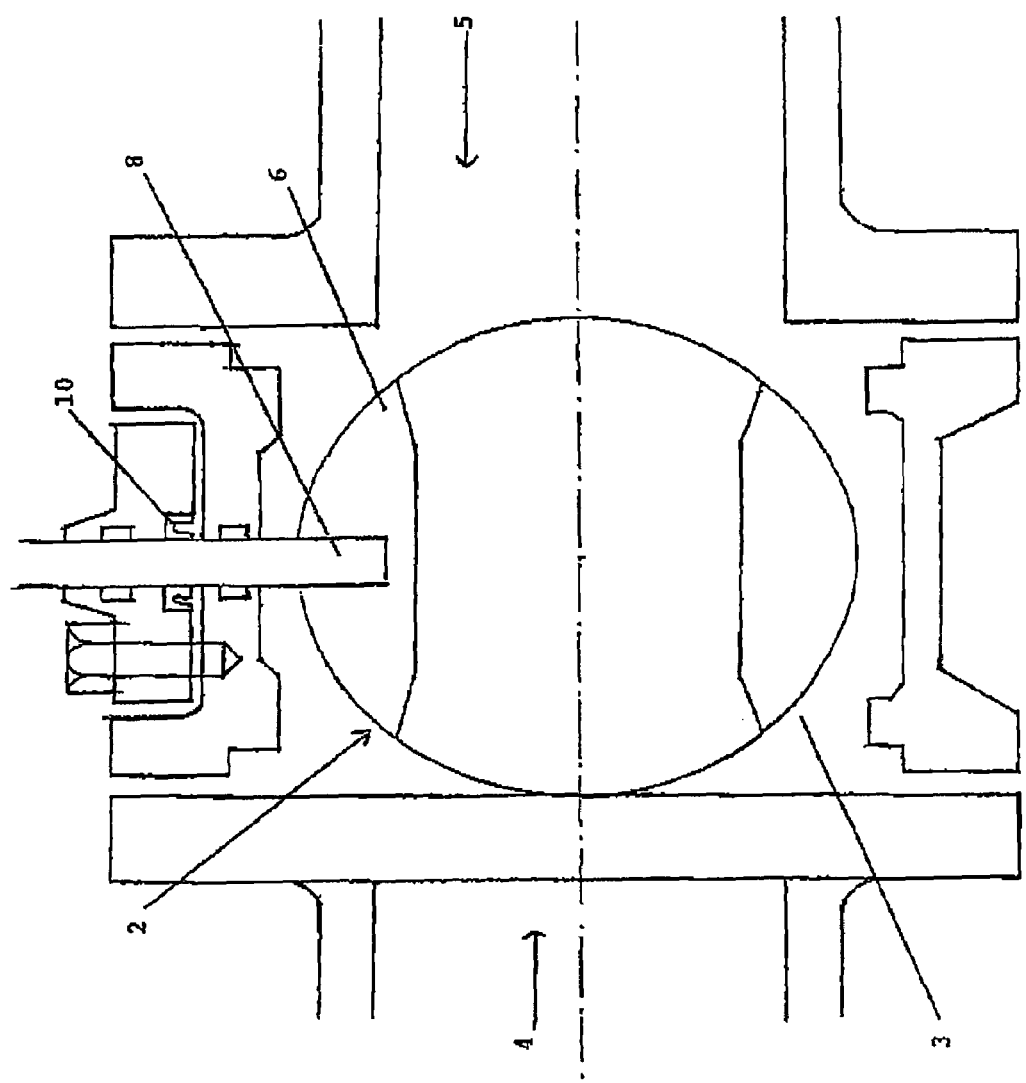
FIG. 1 shows a general view of a plug valve according to the invention.

FIG. 1 shows a plug valve 1 according to the invention. This valve 1 typically comprises a valve body 2 defining an essentially cylindrical chamber 3, with an inlet 4 and an outlet 5. In addition, the valve 1 comprises a shutter 6 located in the valve body 2 and in the form of a segment of a sphere (plug) with an opening 7, the form of said segment of a sphere being essentially complementary to that of the chamber 3. This shutter 6 is moreover provided in its upper part with a shaft or a rod 8 linked to an actuator by means of which it may be given a rotary motion in order to open or close the valve.

A completely open position is defined for such a valve, in which the shutter 6 is positioned relative to the chamber so that its opening is aligned with the inlet and the outlet of the chamber and so as to allow the flow of fluid.

A closed position is also defined for this valve 1, in which the shutter is positioned relative to the chamber so that there is no such alignment between the opening 5 of the shutter 6 and the inlet 4 and the outlet 5 of the chamber 3, the shutter 6 thus forming a barrier to the flow of fluid through the valve 1.

The valve 1 according to the invention comprises a sealing system at the level of the shaft 8, the purpose of which is to ensure the seal of the valve relative to the outside. It is precisely this sealing system which in fact forms a double-barrier seal at the level of the shaft 8, which is the subject of the present invention.

In addition, the valve preferably comprises an additional sealing system intended to ensure the seal between the upstream zone with regard to the downstream zone relative to the valve when the valve is closed.

The double sealing system of the valve 1 according to the present invention comprises an assembly of two joints 10, 10 rigidly fixed onto the actuating shaft or rod 8 of the shutter 6.

A primary joint 10 and a secondary joint 10 are more precisely defined. For reasons of clarity, only one of these joints, the primary joint with the reference 10, has been shown in FIG. 1.

Figure 2:
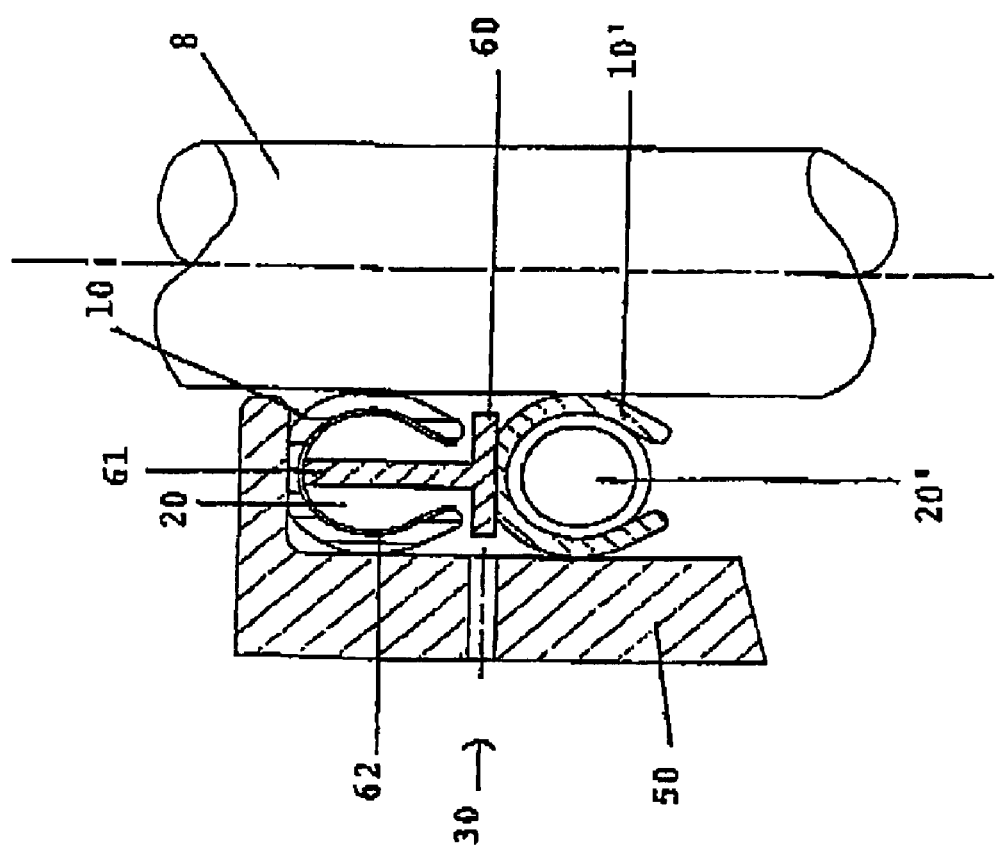
FIG. 2 shows a detailed view of the sealing device of a plug valve according to a first embodiment of the present invention.

According to a first embodiment detailed in FIG. 2, the primary joint 10 and secondary joint 10' correspond to two separate joints which are arranged in series along the shaft 8.

Each joint 10, 10' advantageously takes the form of a U-shaped joint, i.e. a circular or annular joint with a U-shaped cross-section. The primary and secondary joints thus define a primary cavity 20 and a secondary cavity 20', respectively.

In the state of the art, each primary joint 10 and secondary joint 10' is separately (individually) arranged in a "lid" consisting of a mechanical part and the lids are directly fixed onto the casing by known means, such as screwed nuts.

In the present invention by contrast, the primary 10 and secondary 10' joints are supported and maintained in place by one and the same lid (reference 50) as shown in FIG. 2, and no longer by two separate lids as in the state of the art. This allows to wisely simplify the assembly and construction of this type of plug valve with a double seal.

These joints 10, 10' are preferably annular joints made of polymer or elastomer materials. According to one particular embodiment, these joints may be circular joints with a U-shaped cross-section.

As a particular advantage, this lid 50 comprises a channel 30 intended to collect any possible leaking liquid. This channel 30 is preferably located at the level (height) of both primary and secondary joints.

According to one preferred embodiment, a cross bar 60, for instance T-shaped, is provided between the two joints 10, 10', and helps to maintain the primary and secondary joints in place.

According to a still preferred embodiment, pressure means, for instance in the form of a metal sheet 62, is advantageously provided around the foot 61 of the cross bar 60. This pressure means 62 acts as a spring and is used to press the joint lips against the faces to be sealed of the valve shaft. Moreover, this pressure means can act as a pressure distributor in the case where contact pressures would be too important at the level of the secondary joint 10' while preventing the crushing of the latter.

Figure 3:
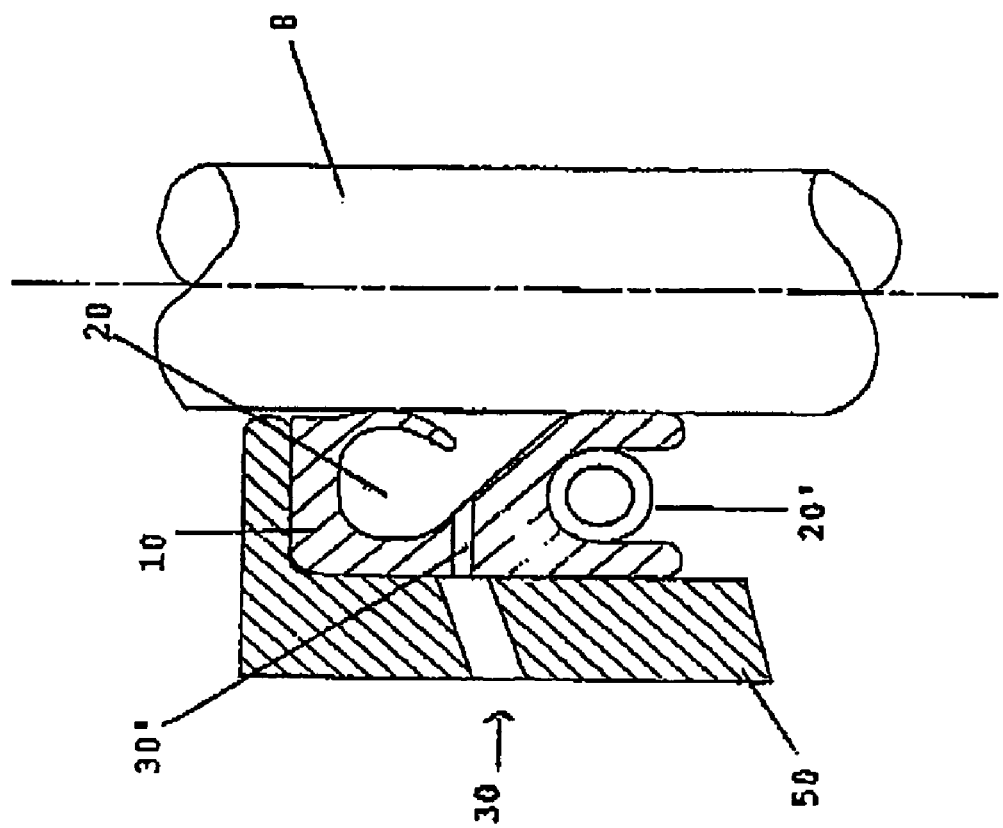
FIG. 3 shows a detailed view of the sealing device of a plug valve according to a second embodiment of the present invention.

According to a second preferred embodiment of the invention shown in FIG. 3, the present invention proposes to use a double sealing system provided with a single lid 50 and where only one single double joint 10 ensures the function of a double-barrier seal. In this embodiment, the primary 10 and secondary 10' joints thus make up one and the same double joint 10.

This double joint 10 advantageously has two cavities, a primary cavity 20 and a secondary cavity 20', and acts as a double U-joint or W-joint.

In addition, as in the first embodiment, the valve comprises in the lid 50 a channel 30 for collecting any leaking fluid.

As a particular advantage, the double joint 10 itself comprises a channel 30' for collecting any leaking liquid. This channel 30' is preferably located at the level of the junction between the primary cavity 20 and the secondary cavity 20'.

The channels 30 and 30' are preferably configured relative to each other so that the channel 30' extends and passes through the lid 50.

A pressure means is preferably provided in the form of a metal sheet 62 inside the cavity 20 of the double joint 10 (central cavity).

This second embodiment provides the advantage of further reducing the number of parts while at the same time maintaining the double seal at the level of the valve shaft and the collection of leaks.

What is claimed is:

1. A plug valve comprising a valve body and a shutter that can be actuated, in the form of a segment of a sphere provided with a mobile shaft in rotation and/or translation, said valve also comprising a double barrier sealing system comprising a double joint at the level of said shaft, said double joint having two cavities, a primary cavity and a secondary cavity, said double joint being maintained in place relative to the shaft by means of a single lid, said lid comprising a first channel for collecting leaking fluid at the level of the lid, said double joint comprising a second channel for collecting any leaking fluid present between the joints of the double-barrier sealing system, said second channel passing through the double-barrier sealing system and communicating with the first channel, wherein a pressure means is placed inside at least one of said cavities of the double joint.

2. The valve of claim 1, wherein the pressure means is in the form of a metal sheet.

3. A double-barrier sealing system at the level of a mobile shaft in rotation and/or translation in a plug valve, comprising a double joint having two cavities, a primary cavity and a secondary cavity, said double joint being maintained in place relative to the shaft by means of a single lid, said lid comprising a first channel for collecting leaking fluid at the level of the lid, said double joint comprising a second channel for collecting any leaking fluid present between the joints of the double-barrier sealing system, said second channel passing through the double-barrier sealing system, and communicating with the first channel wherein a pressure means is placed inside at least one of said cavities of the double joint.

4. A plug valve comprising:
a valve body;
a shutter that can be actuated, wherein the shutter is in the form of a segment of a sphere provided with a mobile shaft in rotation and/or translation; and
a double-barrier sealing system at the level of said shaft, wherein joints of said double-barrier sealing system are maintained in place relative to the shaft by means of a single lid, wherein a primary joint and a secondary joint are circular joints with a U-shaped cross-section defining a primary cavity and a secondary cavity, respectively, and
wherein said primary and secondary joints are separated by a T-shaped cross bar, the foot
of which is located inside one of said cavities.

5. The valve of claim 4, wherein a pressure means is located at the foot of the cross bar.

6. The valve of claim 5, wherein the pressure means is in the form of a metal sheet.

7. The valve of claim 4, wherein a pressure means is placed inside at least one of said cavities.

8. The valve of claim 4, wherein the lid comprises a channel for collecting any leaking liquid present between the joints of the double-baffler sealing system.

* * * * *

UNITED STATES PATENT AND TRADEMARK OFFICE
CERTIFICATE OF CORRECTION

| | | |
|---|---|---|
| PATENT NO. | : 7,111,821 B2 | Page 1 of 1 |
| APPLICATION NO. | : 10/742680 | |
| DATED | : September 26, 2006 | |
| INVENTOR(S) | : Christophe Promper | |

It is certified that error appears in the above-identified patent and that said Letters Patent is hereby corrected as shown below:

In column 2, line 2, after "cavity" insert -- , --.

In column 3, line 61, after "10," delete "10" and insert -- 10' --, therefor.

In column 3, line 64, after "joint" delete "10" and insert -- 10' --, therefor.

In column 5, line 9, in Claim 1, delete "double barrier" and insert -- double-barrier --, therefor.

In column 6, line 3, in Claim 3, after "channel" insert -- , --.

In column 6, line 29, in Claim 8, delete "double-baffler" and insert -- double-barrier --, therefor.

Signed and Sealed this

Third Day of April, 2007

JON W. DUDAS
*Director of the United States Patent and Trademark Office*